US007976447B2

(12) United States Patent
Urano et al.

(10) Patent No.: US 7,976,447 B2
(45) Date of Patent: Jul. 12, 2011

(54) CONDUCTIVE RUBBER ROLLER AND TRANSFER ROLLER

(75) Inventors: Ryuta Urano, Ushiku (JP); Hiroshi Imasaka, Tokyo (JP)

(73) Assignee: Canon Kasei Kabushiki Kaisha, Tsukuba-shi (JP)

( * ) Notice: Subject to any disclaimer, the term of this patent is extended or adjusted under 35 U.S.C. 154(b) by 866 days.

(21) Appl. No.: 11/964,189

(22) Filed: Dec. 26, 2007

(65) Prior Publication Data

US 2008/0159791 A1 Jul. 3, 2008

(30) Foreign Application Priority Data

Dec. 27, 2006 (JP) ................................ 2006-351927

(51) Int. Cl.
*F16C 13/00* (2006.01)

(52) U.S. Cl. ................. 492/59; 492/48; 492/56; 492/53

(58) Field of Classification Search .................... 492/48, 492/49, 53, 56, 59
See application file for complete search history.

(56) References Cited

U.S. PATENT DOCUMENTS

| | | | | |
|---|---|---|---|---|
| 6,064,847 | A * | 5/2000 | Iwamatsu et al. | 399/283 |
| 6,945,921 | B2 * | 9/2005 | Sirejacob | 492/56 |
| 7,544,158 | B2 * | 6/2009 | Yamada et al. | 492/56 |
| 7,727,135 | B2 * | 6/2010 | Urano et al. | 492/56 |
| 2003/0216234 | A1 * | 11/2003 | Sirejacob | 492/56 |

FOREIGN PATENT DOCUMENTS

| | | | |
|---|---|---|---|
| JP | 2003171562 | A * | 6/2003 |
| JP | 2003345090 | A * | 12/2003 |
| JP | 2006171278 | A * | 6/2006 |
| JP | 2007171279 | A * | 7/2007 |
| JP | 2008164757 | A * | 7/2008 |

OTHER PUBLICATIONS

Machine English translation of JP 2003-171562 A.*
Machine English translation of JP 2006-171278 A.*

* cited by examiner

*Primary Examiner* — Essama Omgba
(74) *Attorney, Agent, or Firm* — Fitzpatrick, Cella, Harper & Scinto

(57) ABSTRACT

A conductive rubber roller having a rubber layer on a conductive core material. The rubber composition constituting the rubber layer contains a rubber component and a filler. The rubber component contains an epichlorohydrin rubber. The filler includes carbon black (A) having a nitrogen adsorption specific surface area ($N_2SA$) of 20 $m^2/g$ to 40 $m^2/g$ and having a dibutyl phthalate (DBP) oil absorption of 80 ml/100 g to 100 ml/100 g and carbon black (B) having a nitrogen adsorption specific surface area ($N_2SA$) of 15 $m^2/g$ or less and having a dibutyl phthalate (DBP) oil absorption of 40 ml/100 g or less. The carbon black (A) is in a content of 10 parts by mass to 30 parts by mass and the carbon black (B) is in a content of 20 parts by mass to 60 parts by mass or less, based on 100 parts by mass of the rubber component.

4 Claims, No Drawings

CONDUCTIVE RUBBER ROLLER AND TRANSFER ROLLER

BACKGROUND OF THE INVENTION

1. Field of the Invention

The present invention relates to a conductive rubber roller for use in image forming apparatus such as electrophotographic copying machines, printers, and electrostatic recording apparatus. More particularly, the present invention relates to a transfer roller used in a transfer device for transferring to a recording medium or a transfer material, such as paper, transferable images constituted of toner images which are formed by making use of an image forming means, such as an electrophotographic process and/or an electrostatic recording process, and then held on an image carrying member such as an electrophotographic photosensitive member.

2. Description of the Related Art

In image forming apparatus such as electrophotographic copying machines and/or electrostatic recording apparatus, a contact charging system is mainly used which involves pressing a conductive rubber roller, to which a voltage is applied, against the surface of an electrophotographic photosensitive member for charging. The conductive rubber roller is used individually in each of steps, such as charging and transfer steps, and disposed around the electrophotographic photosensitive member drum, which is a main element for image formation.

In recent years, polar rubber such as acrylonitrile-butadiene rubber or epichlorohydrin rubber has been used as a rubber component for such a conductive rubber roller. It has been known that the polar rubber exhibits conductivity (ion conductivity) due to the presence of a polar group in its polymer molecule and it is suitable for use in the conductive rubber roller because of its small variation in the electrical resistance and small voltage dependence of the electrical resistance.

The above-mentioned conductive rubber roller is, in most cases, required to possess an elastic body layer having a volume resistivity of $2\times10^9$ Ω·cm or less. A vulcanized product has a volume resistivity of about $2\times10^9$ Ω·cm to $1\times10^{10}$ Ω·cm when its rubber component is acrylonitrile-butadiene rubber alone, resulting in an insufficient conductivity.

Therefore, used is commonly an adjustment method for obtaining a desired volume resistivity by blending epichlorohydrin rubber, which is known to provide a vulcanized product having a volume resistivity of about $1\times10^7$ to $3\times10^9$ Ω·cm, to acrylonitrile-butadiene rubber (e.g., Japanese Patent No. 3656904).

Further, in recent years, a conductive rubber roller with a lower resistance has been demanded in order to achieve the formation of color images and provide high quality images. Hence, used is a method of using epichlorohydrin rubber alone or a method of adding to the rubber various ion conductive agents such as quaternary ammonium salts containing a perchlorate ion and a chloride ion (e.g., Japanese Patent Application Laid-Open No. 2002-132020).

Generally, however, in the case of a conductive rubber roller using such a rubber elastic body, its resistance value changes with temperature and humidity, which may cause a problem that the quality of images obtained varies depending on the usage environment. Moreover, because the acrylonitrile-butadiene rubber is inferior in ozone resistance, there may be another problem that sufficient electrification durability is not achieved. Moreover, in the above-mentioned method of adding various ion conductive agents such as quaternary ammonium salt, there is a possibility that the contamination by surface migration occurs and the resistance value changes with time due to electrification, and in consequence, a satisfactory electrification durability to cope with the requirements for high speed and long-life use may not be achieved.

As a method of solving the above-mentioned problems, a method of blending two kinds of carbon blacks of Ketjenblack and thermal black whose properties are different from each other in a blend of acrylonitrile-butadiene rubber and an ethylene-propylene-diene copolymer (EPDM) has been proposed (e.g., Japanese Patent No. 3401995).

Moreover, a method of adding a conductive filler such as carbon black to epichlorohydrin rubber has also been proposed (e.g., Japanese Patent Application Laid-Open No. 2005-043703).

A conductive roller using such a conductive rubber material allows a conductive rubber roller that is excellent in environmental dependence and electrification durability to be obtained. However, depending on the dibutyl phthalate (DBP) oil absorption and the nitrogen adsorption specific surface area ($N_2SA$) of the carbon black to be used, the resistance value easily fluctuates according to the dispersion state of the carbon black in the rubber material, and the resistance value varies depending on the material lot. The resistance also varies locally in the conductive roller due to slight differences in the dispersion state of the carbon black. Moreover, there is a problem that it is difficult to obtain a conductive roller having a uniform and stable resistance value because the resistance value fluctuates due to slight deviations in conditions, such as the extruding pressure used in the extruding step. Further, a conductive roller using such a conductive rubber material also has a problem that a precise control device for the applied voltage is required so as to obtain a constant resistance value because the dependence of the resistance value on the applied voltage is high.

SUMMARY OF THE INVENTION

The present invention aims to solve the above-mentioned problems. It is an object of the present invention to provide a conductive rubber roller, such as a transfer roller, charging roller and developing roller, which only exhibits a small fluctuation or variation of the roller resistance value due to deterioration of the electrification durability or changes in the environment and has a small variation in the resistance and a small dependence of the resistance on the voltage and which is prevented from causing the contamination of an electrophotographic photosensitive member. It should be noted that the conductive rubber roller of the present invention is used particularly as a transfer roller.

That is, the present invention provides a conductive rubber roller comprising a rubber layer constituted of a rubber composition on a conductive core material, the rubber composition containing a rubber component and a filler, the rubber component containing as a main component an epichlorohydrin rubber, the filler comprising carbon black (A) having a nitrogen adsorption specific surface area ($N_2SA$) of 20 $m^2/g$ or more and 40 $m^2/g$ or less and having a dibutyl phthalate (DBP) oil absorption of 80 ml/100 g or more and 100 ml/100 g or less and carbon black (B) having a nitrogen adsorption specific surface area ($N_2SA$) of 15 $m^2/g$ or less and having a dibutyl phthalate (DBP) oil absorption of 40 ml/100 g or less, in which the carbon black (A) is in a content of 10 parts by mass or more and 30 parts by mass or less based on 100 parts by mass of the rubber component and the carbon black (B) is in a content of 20 parts by mass or more and 60 parts by mass or less based on 100 parts by mass of the rubber component.

Further, the conductive rubber roller in which the epichlorohydrin rubber contains one of or both of (i) an epichlorohydrin-ethylene oxide-allyl glycidyl ether terpolymer and (ii) an epichlorohydrin-allyl glycidyl ether copolymer is provided.

Still further, the conductive rubber roller in which the total content of the carbon black (A) and the carbon black (B) is 35 vol % or less based on 100 vol % of the rubber composition is provided.

The present invention also provides the conductive rubber roller in which the carbon black (A) is acidic carbon black whose pH is 5 or lower.

Further, the conductive rubber roller including 0.1 part by mass or more and 1 part by mass or less of a bisphenol antioxidant based on 100 parts by mass of the rubber component is provided.

In addition, a transfer roller is provided, which is used in an image forming apparatus for developing an electrostatic charge image held on an electrophotographic photosensitive member with a developer, in which the transfer roller is the conductive rubber roller that is disposed facing the electrophotographic photosensitive member.

The conductive rubber roller of the present invention has a small fluctuation or variation of the roller resistance value due to deterioration of the electrification durability or changes in the environment and exhibits a small variation in the resistance and a small dependence of the resistance on voltage and, the roller is prevented from causing contamination of an electrophotographic photosensitive member. Therefore, the conductive rubber roller of the present invention is preferred as a transfer roller used in a transfer device that transfers to a recording medium or a transfer material such as paper transferable images of toner which is formed and held on an image carrying member such as an electrophotographic photosensitive member, by an image forming means in an electrophotographic process and/or an electrostatic recording process.

DESCRIPTION OF THE EMBODIMENTS

The inventors of the present invention have carried out extensive research in order to solve the above-mentioned problems and have found that in a conductive rubber roller having a rubber layer disposed on a conductive core material, the incorporation of a specific amount of carbon blacks having an nitrogen adsorption specific surface area ($N_2SA$) and dibutyl phthalate (DBP) oil absorption in predetermined ranges in a specific rubber component provides a conductive rubber roller which only exhibits a small fluctuation or variation of the roller resistance value due to deterioration of the electrification durability or changes in the environment and has a small variation in the resistance and a small dependence of the resistance on the voltage and which is prevented from causing the contamination of an electrophotographic photosensitive member.

Hereinafter, the conductive rubber roller according to the present invention will be described in detail.

The rubber layer used in the present invention is constituted of a rubber composition. The rubber composition contains a rubber component and a filler. The rubber component contains as the main component an epichlorohydrin rubber. The filler comprises carbon black (A) having a nitrogen adsorption specific surface area ($N_2SA$) of 20 $m^2/g$ or more and 40 $m^2/g$ or less and having a dibutyl phthalate (DBP) oil absorption of 80 ml/100 g or more and 100 ml/100 g or less and carbon black (B) having a nitrogen adsorption specific surface area ($N_2SA$) of 15 $m^2/g$ or less and having a dibutyl phthalate (DBP) oil absorption of 40 ml/100 g or less. The carbon black (A) is in a content of 10 parts by mass or more and 30 parts by mass or less based on 100 parts by mass of the rubber component and the carbon black (B) is in a content of 20 parts by mass or more and 60 parts by mass or less based on 100 parts by mass of the rubber component.

The rubber component of the present invention contains an epichlorohydrin rubber as the main component. When nonpolar rubbers, such as an ethylene-propylene-diene copolymer (EPDM), styrene-butadiene rubber (SBR), and isoprene rubber (IR), are used as the main component of the rubber component, even if the above-mentioned carbon blacks are used, the resistance value varies among material lots, and, in addition, the variation in the local resistance occurs also in the interior of conductive roller, which makes it difficult to obtain a conductive roller having a uniform and stable resistance value. In that case, because ion conductivity is not imparted, it is difficult to reduce the volume resistivity to $2\times10^9$ Ω·cm or lower, which is a volume resistivity required in an elastic body layer of conductive rubber roller. When acrylonitrile-butadiene rubber (NBR) is used as the main rubber component and the above-mentioned carbon blacks are used, the volume resistivity can be controlled to $2\times10^9$ Ω·cm or lower and a conductive rubber roller having an excellent environmental dependence can be obtained. However, because the acrylonitrile-butadiene rubber is inferior in the ozone resistance, there arises a problem that the resistance value increases by electrification, that is, electrification deterioration.

The content of epichlorohydrin rubber is preferably 70 parts by mass or more, and more preferably 85 parts by mass or more, when the total amount of the rubber component is made 100 parts by mass, in view of the electrification durability.

Usable as the epichlorohydrin rubber in the present invention are known epichlorohydrin monomer (ECH), epichlorohydrin-ethylene oxide copolymer (ECH-EO), epichlorohydrin-allyl glycidyl ether copolymer (ECH-AGE), and epichlorohydrin-ethylene oxide-allyl glycidyl ether terpolymer (ECH-EO-AGE), and two or more of the above mentioned substances may be blended depending on the desired properties such as resistance value. It is preferable to include any one or both of the epichlorohydrin-ethylene oxide-allyl glycidyl ether terpolymer and epichlorohydrin-allyl glycidyl ether copolymer.

An unsaturated epichlorohydrin rubber with which allyl glycidyl ether is copolymerized has more excellent heat resistance and ozone resistance compared with the epichlorohydrin monomer or the epichlorohydrin-ethylene oxide copolymer, whereby a conductive rubber roller having more excellent electrification durability can be obtained. Further, the unsaturated epichlorohydrin rubber may be subjected to sulfur vulcanization through allyl glycidyl ether having an unsaturated bond, thereby providing the epichlorohydrin-allyl glycidyl ether copolymer. It should be noted that the sulfur vulcanization is the most common as a rubber vulcanization method and is preferable because the composition used is inexpensive and can be manufactured by any vulcanization processes.

As the carbon blacks to be blended in such specific rubber are used carbon black (A) having a nitrogen adsorption specific surface area ($N_2SA$) of 20 $m^2/g$ or more and 40 $m^2/g$ or less and having a dibutyl phthalate (DBP) oil absorption of 80 ml/100 g or more and 100 ml/100 g or less; and carbon black (B) having a nitrogen adsorption specific surface area ($N_2SA$) of 15 $m^2/g$ or less and having a dibutyl phthalate (DBP) oil absorption of 40 ml/100 g or less. The carbon black (A) is used in a content of 10 parts by mass or more and 30 parts by mass or less based on 100 parts by mass of the rubber component, and the carbon black (B) is used in a content of 20 parts by mass or more and 60 parts by mass or less based on 100 parts by mass of the rubber component.

Here, the nitrogen adsorption specific surface area ($N_2SA$) serves as an index of a particle diameter of the carbon black, and when the carbon black has a nitrogen adsorption specific surface area ($N_2SA$) in the range of 20 $m^2/g$ or more and 40 $m^2/g$ or less, it means that the carbon black has a relatively small particle diameter. The dibutyl phthalate (DBP) oil absorption serves as an index of the magnitude of a structure (linkage of carbon black particles), and when the carbon black has a dibutyl phthalate (DBP) oil absorption of 80 ml/100 g or more and 100 ml/100 g or less, it means that the carbon black has a structure to some extent. When the carbon black (B) has a nitrogen adsorption specific surface area ($N_2SA$) of 15 $m^2/g$ or less, it means that the carbon black has a large particle diameter, and when the carbon black (B) has a dibutyl phthalate (DBP) oil-absorption of 40 ml/100 g or less, it means that the carbon black (B) has almost no structure.

According to the present invention, by the combined use of the above-mentioned carbon black (A) which is relatively likely to develop conductivity and the carbon black (B) which can hardly develop conductivity, a conductivity imparting effect by the carbon black is controlled, thereby realizing a conductive rubber roller with an improved environmental dependence of epichlorohydrin rubber and with suppressed defects of electronic conductivity, such as resistance variation and voltage dependence.

When the nitrogen adsorption specific surface area ($N_2SA$) of the above-mentioned carbon black (A) is larger than 40 $m^2/g$, or when the dibutyl phthalate (DBP) oil absorption thereof is larger than 100 ml/100 g, the dependence of the resistance on the voltage is likely to occur depending on the amount of the carbon black (A) added. When the nitrogen adsorption specific surface area of the above-mentioned carbon black (A) is smaller than 20 $m^2/g$, or when the dibutyl phthalate (DBP) oil absorption thereof is lower than 80 ml/100 g, a large amount of carbon black is required to add so as to acquire a predetermined resistance value, which excessively increases the hardness of an elastic body.

The above-mentioned carbon black (A) is added in a content of 10 parts by mass or more and 30 parts by mass or less based on 100 part by mass of the rubber component. When its content is less than 10 parts by mass, an effect of improving the dependence of the resistance on the environment cannot be achieved. When its content exceeds 30 parts by mass, the conductivity imparting effect of the carbon black (A) becomes excessively high, which increases the variation in the resistance and the dependence of the resistance on the voltage or increases the hardness excessively.

When the nitrogen adsorption specific surface area ($N_2SA$) of the above-mentioned carbon black (B) is larger than 15 $m^2/g$, or when the dibutyl phthalate (DBP) oil absorption thereof is larger than 40 ml/100 g, the conductivity imparting effect is excessively high, the dependence of the resistance on the voltage is likely to occur. The above-mentioned carbon black (B) is added in a content of 20 parts by mass or more and 60 parts by mass or less based on 100 parts by mass of the rubber component. When its content is less than 20 parts by mass, the dependence of the resistance on the environment cannot be improved. When its content exceeds 60 parts by mass, the conductivity imparting effect of the carbon black (B) is excessively high, which increases the variation in the resistance and the dependence of the resistance on the voltage or increases the hardness excessively.

The total content of the carbon black (A) and the carbon black (B) is preferably 35 vol % or less based on 100 vol % of the rubber composition. When the total content of the carbon black (A) and the carbon black (B) exceeds 35 vol %, the dependence of the resistance on the voltage tends to become large. Although the cause of the above tendency is not elucidated, it is presumably because when the volume ratio of the carbon black in the rubber composition is high, carbon black particles are close to each other, which facilitates the motion of n electrons.

The above-mentioned carbon black (A) is preferably an acidic carbon black whose pH is 5.0 or less. Because the acidic carbon black has an acidic functional group on the surface, it can trap a radical. Thus, the acidic carbon black presumably has an effect of inhibiting a deterioration reaction by trapping a polymer radical formed when the rubber component in the conductive rubber roller deteriorates, thereby improving the durability of the conductive rubber roller.

In the present invention, it is preferable to incorporate a bisphenol antioxidant as an antioxidant. In this case, the epichlorohydrin rubber can be prevented from being deteriorated, so that a conductive rubber roller excellent in the durability can be obtained. When the antioxidant is used in too large amount, there is a possibility that bloom may occur and a photosensitive member may be contaminated. Thus, the amount of the antioxidant is preferably 0.1 part by mass or more and 1 part by mass or less.

The rubber composition used in the conductive rubber roller of the present invention may, as required, contain other components which are used in common rubbers in an amount commonly used. For example, vulcanizing agents such as sulfur and an organic sulfur-containing compound; various vulcanization accelerators; various fillers such as calcium carbonate, clay, silica, and talc; various lubricants; processing assistants such as vulcanized oil; various foaming agents such as p,p'-oxybisbenzenesulfonylhydrazide (OBSH), azodicarbonamide (ADCA), and dinitrosopentamethylenetetramine (DPT); various foaming assistants such as urea; and vulcanizing assistants such as zinc oxide and stearic acid may be contained in an amount required according to the intended use of the roller.

The conductive rubber roller of the present invention may be obtained by means of a production method involving: extruding an unvulcanized conductive rubber composition in the form of a tube with an extruder at a rate of 2 m/minute to 10 m/minute; heating the resultant at 140 to 160° C. for 20 to 50 minutes in a vulcanizer or a continuous vulcanizer to form a conductive rubber (elastic body) tube; inserting a conductive core material to which an adhesive is applied, into the conductive rubber tube; heating the resultant at 150 to 200° C. for 10 to 60 minutes to adhere the conductive core material to the conductive rubber tube; placing the resultant in a grinder equipped with a grinding stone GC#60-120; and grinding the resultant under grinding conditions including a rotating velocity of 1,500 to 2,000 rpm and a feeding rate of 300 to 700 mm/minute. Besides, applicable are various known production methods, such as a method of simultaneously extruding an unvulcanized conductive rubber composition and a conductive core material to which an adhesive is applied and a method of extruding and placing a conductive rubber composition in a mold for vulcanizing. Moreover, the conductive roller of the present invention may, as required, be provided with a layer such as of resin on the outer circumference of the elastic body layer.

It is preferable that the conductive rubber roller of the present invention be used in an image forming apparatus for developing an electrostatic charge image held on an electrophotographic photosensitive member with a developer and that the conductive rubber roller be a transfer roller disposed facing the electrophotographic photosensitive member.

EXAMPLES

Hereinafter, the present invention will be described in detail with reference to the following Examples and Comparative Examples but is not limited thereto.

Examples 1 to 6, Comparative Examples 1 to 8

The proportions of rubber compositions used in Examples and Comparative Examples and test results are as shown in Tables 1 to 3. It should be noted that the unit of the proportion is "part by mass".

First, the raw materials shown below were kneaded with an open roll to prepare rubber compositions for the Examples and Comparative Examples. The materials used in the Examples and Comparative Examples are as follows.

Epichlorhydrin Rubbers:

[Epichlorhydrin rubber 1: Epichlorhydrin-ethylene oxide-allyl glycidyl ether copolymer having a copolymerization ratio (mol %) of 93:0:7; trade name: Zecron 1100 manufactured by ZEON CORPORATION]

[Epichlorhydrin rubber 2: Epichlorhydrin-ethylene oxide-allyl glycidyl ether copolymer having a copolymerization ratio (mol %) of 67:25:8; trade name: Zecron 3100 manufactured by ZEON CORPORATION]

[Epichlorhydrin rubber 3: Epichlorhydrin-ethylene oxide-allyl glycidyl ether copolymer having a copolymerization ratio (mol %) of 40:56:4; trade name: Zecron 3106 manufactured by ZEON CORPORATION]

Acrylonitrile Butadiene Rubber:

[Acrylonitrile content 18% by mass; trade name: Nipol DN401L manufactured by ZEON CORPORATION]

Ionic Conductive Agent:

[Quaternary ammonium salt (EO-addition quaternary ammonium salt); trade name: KS-555 manufactured by KAO CORPORATION]

Carbon Blacks:

[Carbon black 1: nitrogen adsorption specific surface area 31 $m^2/g$, DBP oil adsorption 91 ml/100 g, pH 3.0; trade name: MA-220 manufactured by Mitsubishi Chemical Corporation]

[Carbon black 2: nitrogen adsorption specific surface area 85 $m^2/g$, DBP oil adsorption 113 ml/100 g, pH 3.0; trade name: MA-230 manufactured by Mitsubishi Chemical Corporation]

[Carbon black 3: nitrogen adsorption specific surface area 36 $m^2/g$, DBP oil adsorption 91 ml/100 g, pH 6.6; trade name: NITERON #55U manufactured by Nippon Steel Chemical Carbon Co., Ltd.]

[Carbon black 4: nitrogen adsorption specific surface area 9 $m^2/g$, DBP oil adsorption 37 ml/100 g, pH 7.3; trade name: Thermax MT manufactured by Cancarb Limited]

[Carbon black 5: nitrogen adsorption specific surface area 24 $m^2/g$, DBP oil adsorption 28 ml/100 g, pH 8.0; trade name: Asahi-Thermal manufactured by Asahi Carbon Co, Ltd.]

Antioxidant:

[Bisphenol antioxidant: trade name: NOCRAC 300 manufactured by OUCHI SHINKO CHEMICAL INDUSTRIAL CO., LTD.]

Vulcanizing Agent:

[Sulfur (S); trade name: SULFAX PMC manufactured by Tsurumi Chemical Industries, Ltd.]

Vulcanization Accelerator:

[Dibenzothiazyl disulfide (DM); trade name: NOCCELER DM manufactured by OUCHI SHINKO CHEMICAL INDUSTRIAL CO., LTD.]

[Tetraethylthiuram disulfide (TET); trade name: NOCCELER TET manufactured by OUCHI SHINKO CHEMICAL INDUSTRIAL CO., LTD.]

Vulcanization Accelerator Assistants:

[Zinc oxide; trade name: zinc oxide type 2 manufactured by HakusuiTech Co., Ltd.]

[Stearic acid; trade name: Lunack S20 manufactured KAO CORPORATION.]

Foaming Agent:

[Azodicarbonamide: trade name: VINYFOR AC#LQ manufactured by EIWA CHEMICAL IND. CO., LTD.]

Foaming Assistant:

[Urea; trade name: CELLPASTE A manufactured by EIWA CHEMICAL IND. CO., LTD.]

The conductive rubber rollers of the Examples and Comparative Examples were manufactured as follows: Rubber compositions were extruded in the form of a tube using an extruder, and thereafter, the extrusion products were vulcanized with a vulcanizer at 160° C. for 30 minutes to form tube-shaped vulcanized rubber products. A conductive core material having a diameter of 6 mm was then inserted into a bore diameter portion of the tube-shaped rubber vulcanized products, thereby obtaining roller-shaped products. The formed products were polished so as to have an outside diameter of 14 mm.

<Roller Resistance Measurement (Environmental Dependence)>

The conductive rubber rollers manufactured were brought into pressure contact with an aluminum drum having an outer diameter of 30 mm in such a manner that a load of 4.9 N per one side was applied to both sides of the conductive core material of the conductive rubber rollers. For each conductive rubber roller, while rotating at 0.5 Hz, a voltage of 1,000 V was applied between the conductive core material and the aluminum drum, and the current value was measured under the environment of 10° C./15% RH (L/L), 23° C./55% RH (N/N), and 35° C./95% RH (H/H). The resistance value was then calculated according to the Ohm's law, and the obtained value was logarithmically converted. The logarithmically converted value was referred to as roller resistance value Log R. Moreover, a value obtained by subtracting the resistance value Log R measured in H/H from the resistance value Log R measured in L/L was referred to as environmental variation digit. In the Examples and Comparative Examples, the environmental variation digit of the resistance value was evaluated based on the following evaluation criteria. The results are shown in Tables 1 to 3.

AA: Environmental variation digit≦0.5 (Extremely small environmental dependence)

A: 0.5<Environmental variation digit≦1.0 (Small environmental dependence)

C: 1.0<Environmental variation digit (Large environmental dependence)

<Roller Electrification Durability Test>

First, according to the above-described roller resistance measuring method, the current value of the conductive rubber rollers under the environment of 23° C./55% RH (N/N) was measured, and the resistance value was calculated according to the Ohm's law, and the obtained value was logarithmically converted. The logarithmically converted value was referred to as roller resistance value Log R before durability test. Subsequently, each of the conductive rubber rollers was placed under the environment of 50° C. and was brought into a pressure contact with an aluminum drum having an outside diameter of 30 mm in such a manner that a load of 4.9 N per one side was applied to both sides of the conductive core material of the conductive rubber roller. While rotating at 0.2 Hz, a constant current of 80 μA was continuously applied for 25 hours between the conductive core material and the aluminum drum. Subsequently, the current value was measured again under the environment of 23° C./55% RH (N/N). The resistance value was calculated according to the Ohm's law, and the obtained value was logarithmically converted to determine a roller resistance Log R after durability test. In this case, a value obtained by subtracting the roller resistance value Log R before durability test from the roller resistance value Log R after durability test was referred to as durability variation digit. It is assumed that, the smaller the durability variation digit is, the better the electrification durability of the conductive rubber roller is. In the Examples and Comparative Examples, the electrification durability was evaluated based on the following evaluation criteria. The results are shown in Tables 1 to 3.

AA: Durability variation digit≦0.2 (Excellent electrification durability)

A: 0.2<Durability variation digit≦0.3 (Good electrification durability)

C: 0.3<Durability variation digit (Poor electrification durability)

<Dependence of Roller Resistance on Voltage>

According to the above-described roller resistance measuring method, under the environment of 23° C./55% RH (N/N), each of the conductive rubber roller was brought into a pressure contact with an aluminum drum having an outside diameter of 30 mm in such a manner that a load of 4.9 N per one side was applied to both sides of the conductive core material of the conductive rubber roller. While rotating at 0.5 Hz, voltages of 100 V and 1,000 V were applied between the conductive core material and the aluminum drum, and the current value was measured. The resistance value was calculated according to the Ohm's law, and the obtained value was logarithmically converted. Thereafter, a value obtained by dividing the roller resistance value Log R under 100 V application by the roller resistance value Log R under 1,000 V application was made an index of evaluating the voltage dependence. As the index is smaller, the voltage dependence of the conductive rubber roller is better. In the examples and comparative examples, the voltage dependence was evaluated based on the following evaluation criteria. The results are shown in Tables 1 to 3.

AA: Voltage dependence≦1.1 (Extremely small voltage dependence)

A: 1.1<Voltage dependence≦1.2 (Small voltage dependence)

B: 1.2<Voltage dependence≦1.3 (Medium voltage dependence)

C: 1.3<Voltage dependence (Large voltage dependence)

<Roller Resistance Unevenness>

According to the above-described roller resistance measuring method, under the environment of 23° C./55% RH (N/N), each of the conductive rubber rollers was brought into a pressure contact with an aluminum drum having an outside diameter of 30 mm in such a manner that a load of 4.9 N per one side was applied to both sides of the conductive core material of the conductive rubber roller. While rotating at 0.5 Hz, a voltage of 1,000 V was applied between the conductive core material and the aluminum drum to determine the maximum value of resistance and the minimum value of resistance. A value obtained by dividing the maximum value by the minimum value was made an index of evaluating the resistance unevenness (resistance variation). The resistance unevenness was evaluated based on the following evaluation criteria. The results are shown in Tables 1 to 3.

A: Measured value<1.2 (Small resistance unevenness)

C: 1.2≦Measured value (Large resistance unevenness)

<Electrophotographic Photosensitive Member (Photosensitive Member Drum) Contamination>

The conductive rubber rollers each was brought into contact with an electrophotographic photosensitive member used in a laser printer laser jet 4000N manufactured by Hewlett-Packard Company. A load of 1,000 g was then applied to both ends of the conductive core material, and the conductive rubber roller was allowed to stand under the environment of 95% RH at 40° C. for one day. After being allowed to stand, the load was removed. Then, attachments on the electrophotographic photosensitive member were observed by means of a microscope. Thereafter, the used electrophotographic photosensitive member was installed in a cartridge, and solid black images were printed on 30 sheets and the obtained images were visually evaluated. The results are shown in Tables 1 to 3. When the electrophotographic photosensitive member had no attachments thereon and the obtained images were excellent, it is indicated by A. When the electrophotographic photosensitive member had attachments in a slight amount and the obtained images were practically usable, it is indicated by B. When the electrophotographic photosensitive member had attachments and the obtained images were not practically usable, it is indicated by C.

TABLE 1

| | | Example 1 | Example 2 | Example 3 | Example 4 | Example 5 | Example 6 |
|---|---|---|---|---|---|---|---|
| Epichlorohydrin | 1 | 20 | | | 20 | 20 | 20 |
| rubber | 2 | 80 | | | 80 | 80 | 80 |
| | 3 | | 100 | 100 | | | |
| Acrylonitrile-butadiene rubber | | | | | | | |
| Carbon black | 1 | 15 | 15 | 30 | | 15 | 15 |
| | 2 | | | | | | |
| | 3 | | | | 15 | | |
| | 4 | 40 | 40 | 60 | 40 | 40 | 40 |
| | 5 | | | | | | |
| Ion conductive agent | | | | | | | |
| Zinc oxide | | 5 | 5 | 5 | 5 | 5 | 5 |
| Stearic acid | | 1 | 1 | 1 | 1 | 1 | 1 |
| DM | | 1.5 | 1.5 | 1.5 | 1.5 | 1.5 | 1.5 |
| TET | | 1.0 | 1.0 | 1.0 | 1.0 | 1.0 | 1.0 |

TABLE 1-continued

| | | Example 1 | Example 2 | Example 3 | Example 4 | Example 5 | Example 6 |
|---|---|---|---|---|---|---|---|
| Sulfur | | 1.5 | 1.5 | 1.5 | 1.5 | 1.5 | 1.5 |
| Bisphenol antioxidant | | 0.5 | 0.5 | 0.5 | 0.5 | 0 | 1.5 |
| Azodicarbonamide | | 4 | 4 | 4 | 4 | 4 | 4 |
| Urea | | 2 | 2 | 2 | 2 | 2 | 2 |
| Carbon black content (vol %) | | 27.6 | 26.6 | 37.2 | 27.6 | 27.6 | 27.6 |
| Roller | L/L environment | 7.81 | 7.49 | 6.98 | 7.81 | 7.79 | 7.78 |
| resistance | N/N environment | 7.31 | 6.98 | 6.65 | 7.40 | 7.35 | 7.34 |
| Log R | H/H environment | 7.01 | 6.51 | 6.23 | 7.00 | 6.98 | 6.98 |
| | Before durability test | 7.31 | 6.98 | 6.98 | 7.40 | 7.35 | 7.34 |
| | After durability test | 7.41 | 7.08 | 7.01 | 7.61 | 7.58 | 7.49 |
| Environmental variation digit | | 0.80 | 0.98 | 0.75 | 0.81 | 0.81 | 0.80 |
| Durability variation digit | | 0.10 | 0.10 | 0.03 | 0.21 | 0.23 | 0.15 |
| Voltage dependence | | 1.1 | 1.2 | 1.3 | 1.1 | 1.1 | 1.1 |
| Resistance unevenness | | 1.06 | 1.07 | 1.18 | 1.05 | 1.08 | 1.07 |
| Environmental dependence | | A | A | A | A | A | A |
| Electrification durability | | AA | AA | AA | A | A | AA |
| Voltage dependence | | AA | A | B | AA | AA | AA |
| Resistance unevenness | | A | A | A | A | A | A |
| Photosensitive member contamination | | A | A | A | A | A | B |

TABLE 2

| | | Comparative Example 1 | Comparative Example 2 | Comparative Example 3 | Comparative Example 4 |
|---|---|---|---|---|---|
| Epichlorohydrin rubber | 1 | 20 | 20 | 20 | 20 |
| | 2 | 80 | 80 | 80 | 80 |
| | 3 | | | | |
| Acrylonitrile-butadiene rubber | | | | | |
| Carbon black | 1 | | 15 | 5 | 35 |
| | 2 | 15 | | | |
| | 3 | | | | |
| | 4 | 40 | | 40 | 40 |
| | 5 | | 40 | | |
| Ion conductive agent | | | | | |
| Zinc oxide | | 5 | 5 | 5 | 5 |
| Stearic acid | | 1 | 1 | 1 | 1 |
| DM | | 1.5 | 1.5 | 1.5 | 1.5 |
| TET | | 1.0 | 1.0 | 1.0 | 1.0 |
| Sulfur | | 1.5 | 1.5 | 1.5 | 1.5 |
| Bisphenol antioxidant | | 0.5 | 0.5 | 0.5 | 0.5 |
| Azodicarbonamide | | 4 | 4 | 4 | 4 |
| Urea | | 2 | 2 | 2 | 2 |
| Carbon black content (vol %) | | 27.6 | 27.6 | 23.8 | 34.2 |
| Roller | L/L environment | 7.22 | 7.06 | 8.31 | 7.23 |
| resistance | N/N environment | 7.03 | 6.82 | 7.51 | 7.01 |
| Log R | H/H environment | 6.72 | 6.61 | 7.21 | 6.81 |
| | Before durability test | 7.03 | 6.82 | 7.51 | 7.01 |
| | After durability test | 7.15 | 6.97 | 7.57 | 7.12 |
| Environmental variation digit | | 0.50 | 0.45 | 1.10 | 0.42 |
| Durability variation digit | | 0.12 | 0.15 | 0.06 | 0.11 |
| Voltage dependence | | 1.5 | 1.6 | 1.1 | 1.6 |
| Resistance unevenness | | 1.21 | 1.23 | 1.05 | 1.21 |
| Environmental dependence | | AA | AA | C | AA |
| Electrification durability | | AA | AA | AA | AA |
| Voltage dependence | | C | C | AA | C |
| Resistance unevenness | | C | C | A | C |
| Photosensitive member contamination | | A | A | A | A |

TABLE 3

| | | Comparative Example 5 | Comparative Example 6 | Comparative Example 7 | Comparative Example 8 |
|---|---|---|---|---|---|
| Epichlorohydrin | 1 | 20 | 20 | | |
| rubber | 2 | 80 | 80 | | |
| | 3 | | | 40 | 25 |
| Acrylonitrile-butadiene rubber | | | | 60 | 75 |
| Carbon black | 1 | 15 | 15 | 15 | 15 |
| | 2 | | | | |
| | 3 | | | | |
| | 4 | 15 | 65 | 40 | 40 |
| | 5 | | | | |
| Ion conductive agent | | | | | 0.5 |
| Zinc oxide | | 5 | 5 | 5 | 5 |
| Stearic acid | | 1 | 1 | 1 | 1 |
| DM | | 1.5 | 1.5 | 1.5 | 1.5 |
| TET | | 1.0 | 1.0 | 1.0 | 1.0 |
| Sulfur | | 1.5 | 1.5 | 1.5 | 1.5 |
| Bisphenol antioxidant | | 0.5 | 0.5 | 0.5 | 0.5 |
| Azodicarbonamide | | 4 | 4 | 4 | 4 |
| Urea | | 2 | 2 | 2 | 2 |
| Carbon black content (vol %) | | 17.2 | 35.7 | 23.3 | 22.6 |
| Roller | L/L environment | 8.29 | 7.22 | 7.63 | 7.67 |
| resistance | N/N environment | 7.68 | 7.01 | 7.29 | 7.27 |
| Log R | H/H environment | 7.18 | 6.75 | 6.91 | 6.95 |
| | Before durability test | 7.68 | 7.01 | 7.29 | 7.27 |
| | After durability test | 7.75 | 7.12 | 7.61 | 7.48 |
| Environmental variation digit | | 1.11 | 0.47 | 0.72 | 0.72 |
| Durability variation digit | | 0.07 | 0.11 | 0.32 | 0.21 |
| Voltage dependence | | 1.1 | 1.8 | 1.1 | 1.1 |
| Resistance unevenness | | 1.13 | 1.24 | 1.08 | 1.01 |
| Environmental dependence | | C | AA | A | A |
| Electrification durability | | AA | AA | C | A |
| Voltage dependence | | AA | C | AA | AA |
| Resistance unevenness | | A | C | A | A |
| Photosensitive member contamination | | A | A | A | C |

Comparison in the Results Between Example 1 and Comparative Examples 1 to 6

Example 1 and Comparative Examples 1 and 2 show that the carbon black (A) and the carbon black (B) are suitably used in the range required in the present invention. More specifically, in Comparative Example 1 in which the nitrogen adsorption specific surface area of the carbon black (A) is larger than the range of the present invention, a conductive rubber roller excellent in the environmental dependence and the electrification durability can be obtained, but the effect of the carbon black for imparting the conductivity is high, resulting in large voltage dependence and resistance unevenness. Also, in Comparative Example 2 in which the nitrogen adsorption specific surface area of the carbon black (B) is larger than the range of the present invention, a conductive rubber roller excellent in the environmental dependence and the electrification durability is obtained, while the effect of the carbon black for imparting the conductivity is high, resulting in large voltage dependence and resistance unevenness.

In Comparative Examples 3 and 5 in which the amount of the carbon black (A) added or the carbon black (B) added is smaller than the range of the present invention, the environmental dependence is large, and in contrast, in Comparative Examples 4 and 6 in which the amount of the carbon black (A) or the carbon black (B) is larger than the range of the present invention, the voltage dependence and the resistance variation are large.

Comparison in the Results Between Example 1 and Comparative Examples 7 and 8

Example 1 and Comparative Examples 7 and 8 show that the epichlorohydrin rubber as the main rubber component is preferably used in the present invention. More specifically, in Comparative Example 7 in which acrylonitrile-butadiene rubber was the main component, the electrification durability is poor. In Comparative Example 8 in which the electrification durability was improved by the addition of an ion conductive agent in the procedures of Comparative Example 7, the photosensitive member is easily contaminated and thus is not suitable.

Comparison in the Results between Examples 2 and 3

The comparison between Examples 2 and 3 shows that it is more preferable to use the carbon black (A) and the carbon black (B) in the total content equal to or lower than 35 vol % based on 100 vol % of the rubber composition. More specifically, in Example 3 in which the proportion of the carbon black (A) and the carbon black (B) with respect to the rubber composition exceeds 35 vol %, the voltage dependence is increased.

Comparison in the Results Between Examples 1 and 4

The comparison between Examples 1 and 4 shows that the carbon black (A) used in the present invention is more preferably an acidic carbon black whose pH is 5.0 or lower. More specifically, it is revealed that in Example 4 in which the carbon black (A) had a pH of 6.6, the electrification durability is larger than that of Example 1.

Comparison in the Results between Examples 1, 5, and 6

The comparison between Examples 1 and 5 shows that it is more preferable to add a bisphenol antioxidant in an amount of 0.1 part by mass or more and 1 part by mass or less. More specifically, in Example 5 in which no bisphenol antioxidant was added, the electrification durability is lower compared with Example 1 in which 0.5 part by mass of the bisphenol antioxidant was added, and in contrast, in Example 6 in which 1.5 parts by mass of the bisphenol antioxidant was added, its influence on the photosensitive member is increased although the electrification durability is excellent.

As described above, the conductive rubber roller of the present invention exhibits a small fluctuation or variation of the roller resistance value due to the deterioration of the electrification durability or changes in the environment, etc. and further exhibits a small resistance variation and small voltage dependence of resistance. Further, it is a conductive rubber roller which is prevented from causing the contamination of the electrophotographic photosensitive member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-351927, filed Dec. 27, 2006, which is hereby incorporated by reference herein in its entirety.

What is claimed is:

1. A conductive rubber roller comprising a rubber layer constituted of a rubber composition on a conductive core material, the rubber composition containing a rubber component and a filler, the rubber component containing as a main component an epichlorohydrin rubber containing one or both of (i) an epichlorohydrin-ethylene oxide-allyl glycidyl ether terpolymer and (ii) an epichlorohydrin-allyl glycidyl ether copolymer, the filler comprising carbon black (A) having a nitrogen adsorption specific surface area ($N_2SA$) of 20 $m^2/g$ or more and 40 $m^2/g$ or less and having a dibutyl phthalate (DBP) oil absorption of 80 ml/100 g or more and 100 ml/100 g or less and carbon black (B) having a nitrogen adsorption specific surface area ($N_2SA$) of 15 $m^2/g$ or less and having a dibutyl phthalate (DBP) oil absorption of 40 ml/100 g or less, wherein the carbon black (A) is in a content of 10 parts by mass or more and 30 parts by mass or less based on 100 parts by mass of the rubber component and the carbon black (B) is in a content of 20 parts by mass or more and 60 parts by mass or less based on 100 parts by mass of the rubber component, the total content of the carbon black (A) and the carbon black (B) is 35 vol % or less based on 100 vol % of the rubber composition, and the carbon black (A) is acidic carbon black with a pH of 5 or lower.

2. A conductive rubber roller according to claim 1, further comprising 0.1 part by mass or more and 1 part by mass or less of a bisphenol antioxidant based on 100 parts by mass of the rubber component.

3. A transfer roller which is used in an image forming apparatus for developing an electrostatic charge image held on an electrophotographic photosensitive member with a developer, wherein the transfer roller is a conductive rubber roller according to claim 2 that is disposed facing the electrophotographic photosensitive member.

4. A transfer roller which is used in an image forming apparatus for developing an electrostatic charge image held on an electrophotographic photosensitive member with a developer, wherein the transfer roller is a conductive rubber roller according to claim 1 that is disposed facing the electrophotographic photosensitive member.

* * * * *